UNITED STATES PATENT OFFICE.

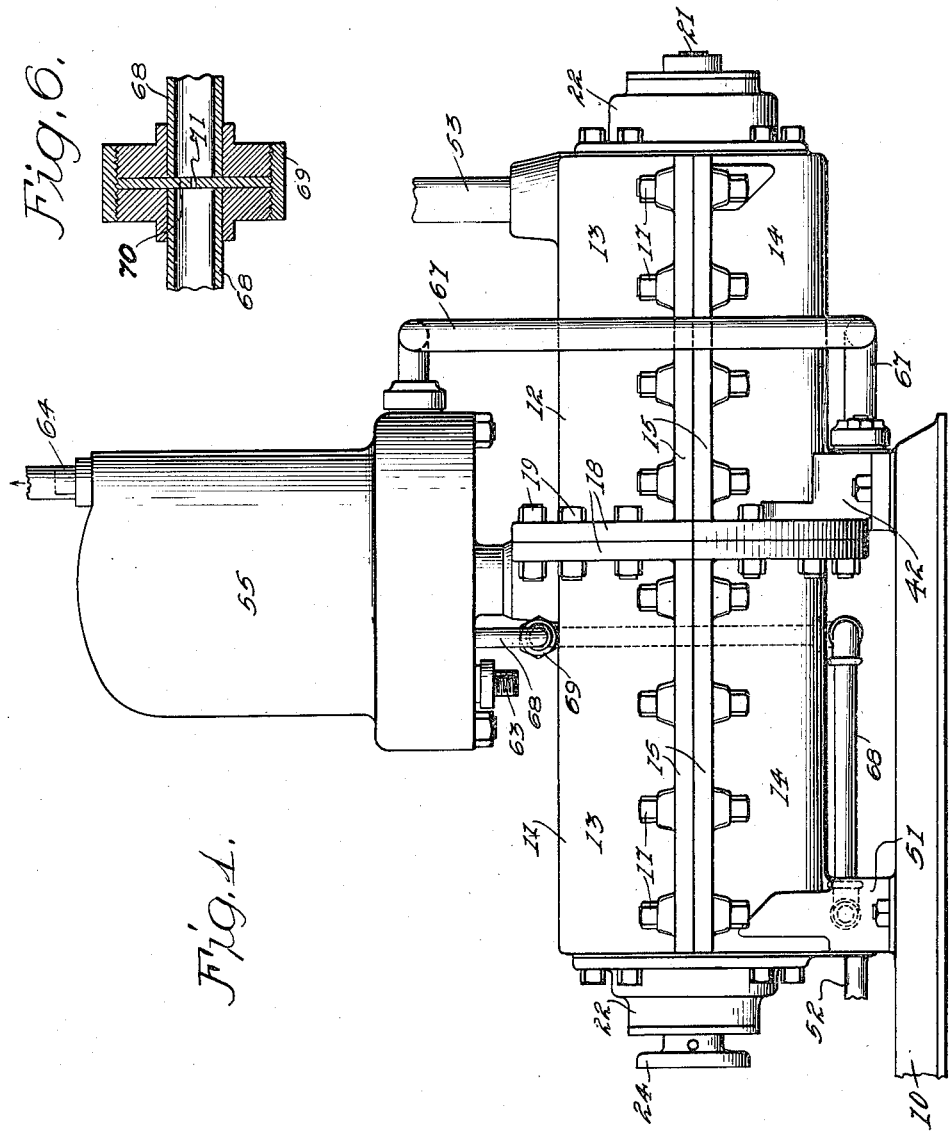

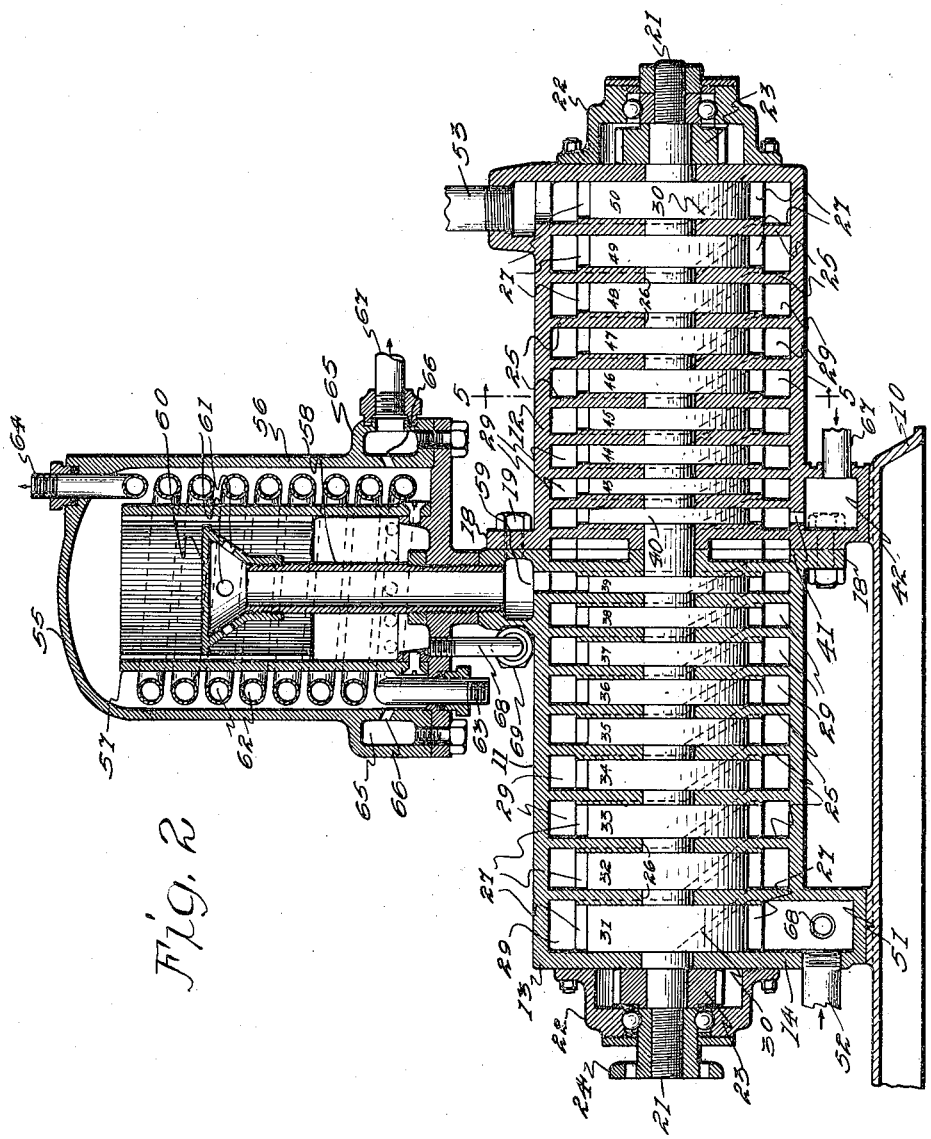

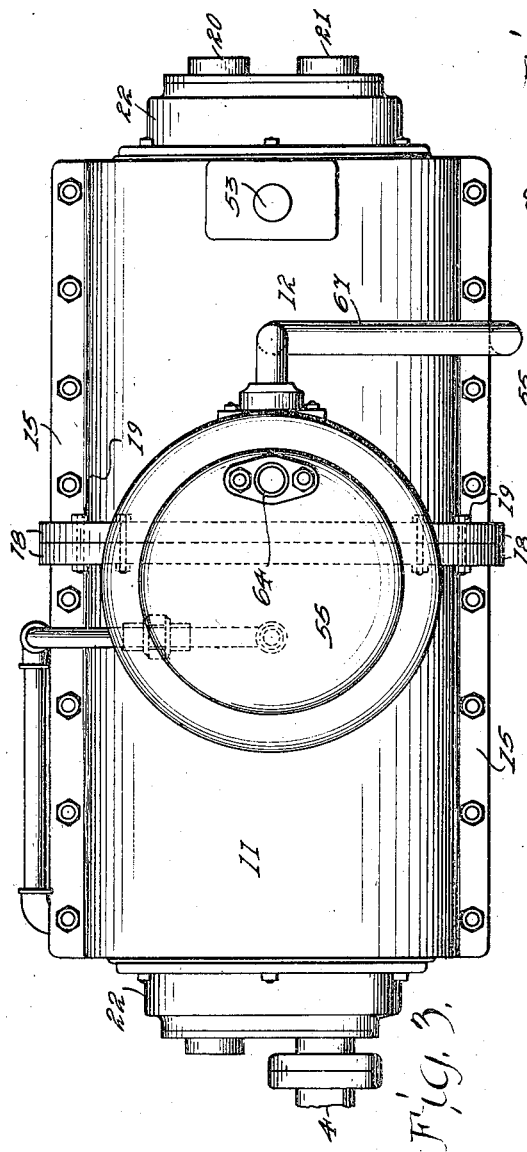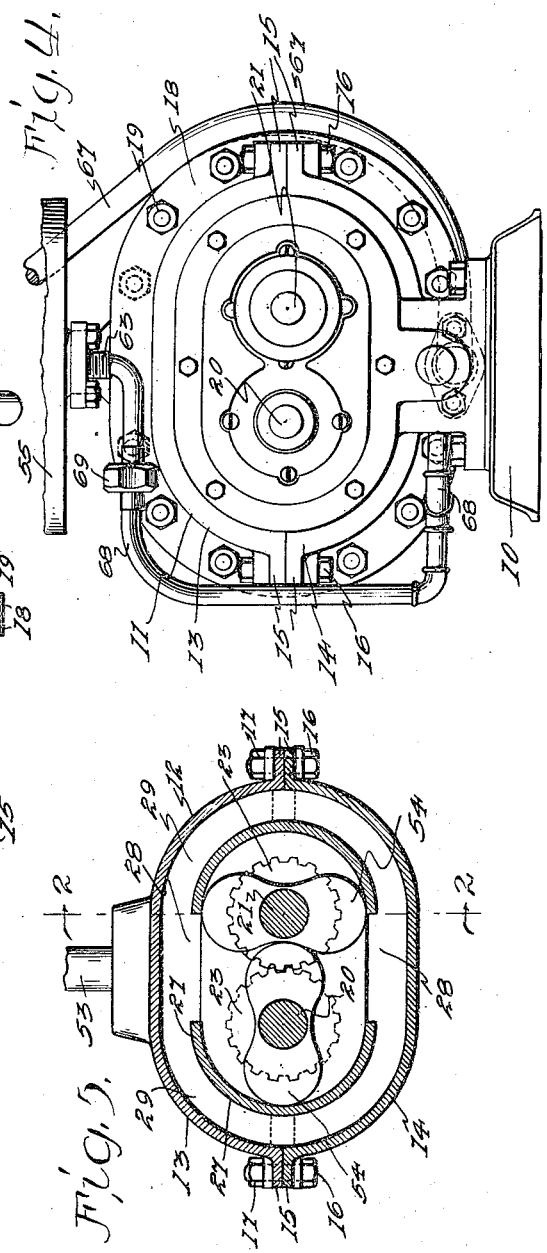

JULIUS FRANKENBERG, OF CHICAGO, ILLINOIS.

AIR-REFRIGERATING MACHINE.

1,295,724. Specification of Letters Patent. Patented Feb. 25, 1919.

Application filed March 31, 1916. Serial No. 87,969.

*To all whom it may concern:*

Be it known that I, JULIUS FRANKENBERG, a citizen of the United States, and resident of Chicago, in the county of Cook and State of Illinois, have invented certain new and useful Improvements in Air-Refrigerating Machines, of which the following is a specification.

This invention relates to improvements in refrigerating apparatus of the type in which air is employed as a refrigerant or refrigerating medium, and it consists in certain peculiarities of the construction, novel combination, arrangement and operation of the various parts thereof, as will be hereinafter more fully set forth and specifically claimed.

The principal objects of the invention are to provide a refrigerating machine using air as a refrigerant, which shall be simple and inexpensive in construction, compact in form, strong, durable, safe and efficient in operation, and especially adapted, by reason of its compactness, efficiency and inexpensiveness and simplicity of operation, for use in small units, such as are employed in residences, or any other place where safety, simplicity and cheapness of operation are absolutely essential; to provide an apparatus of the above named general character which will produce or afford refrigeration uniformly, or with an unvarying output as long as power is supplied thereto, and which shall be of such construction, arrangement and operation of its parts, as to entirely dispense with the use of a series of automatic devices, such as are commonly used on refrigerating machines as heretofore constructed, and which devices often fail to operate when required; to furnish air refrigerating means which employs an air compressor and an air expander of the rotary type, thereby dispensing with reciprocating parts, pistons, compressor valves and valve gearing common in the usual design of the air refrigerating machines now in use; one which employs a rotary air compressor and a rotary air expander, wherein the air is gradually or consecutively compressed and gradually or consecutively expanded, thereby gradually increasing and gradually decreasing the air pressure and thus effecting great efficiency; one which may be operated at high rotative speed, thereby reducing the size and consequent friction load to a minimum, a feature impossible with the reciprocating piston type, since large volumes of air must be produced; one in which the wear of the moving parts is reduced to a minimum, since the rotary impellers or pistons of the compressor and of the expander do not touch the walls of the housing in which they revolve; one which provides automatically a circulation of oil in the compressor of such quantities as to effectively make a practically air tight seal, thus greatly increasing the efficiency of the machine; one which employs a combined air cooler and oil separator of an improved design or construction; and one possessing numerous other objects and advantages which will appear in the following detailed description and explanation of the invention.

In the accompanying drawings, which serve to illustrate an embodiment of the invention—

Figure 1 is a view in side elevation of the refrigerating machine showing a portion of the base on which it is mounted broken away for convenience of illustration.

Fig. 2 is a vertical longitudinal sectional view taken on line 2—2 of Fig. 5 looking in the direction indicated by the arrows.

Fig. 3 is a plan view of the complete machine.

Fig. 4 is an end view, viewed from that end of the compressor to which power for driving the same is applied.

Fig. 5 is a cross sectional view taken on line 5—5 of Fig. 2 looking in the direction indicated by the arrows.

Fig. 6 is an enlarged sectional view of one of the couplings used for uniting the pipe sections which lead from the oil separator to the front portion of the air compressor and illustrating said coupling provided with a perforated diaphragm.

Like numerals of reference refer to corresponding parts throughout the different views of the drawings.

The reference numeral 10 designates a portion of a suitably mounted base upon which the combined air compressor and air expander or air engine is mounted, and also on which an electric motor, or other prime mover may be mounted for use in operating the driving shaft of the said compressor and said expander. As is clearly shown in the drawings, particularly in Figs. 1, 2 and 5 thereof, the air compressor which is indicated as a whole by the reference numeral 11 and the air expander, or air engine is indicated as a whole, by the reference numeral 12, and that said compressor and expander are circular in cross-section, but elliptical or slightly elongated horizontally in cross section, to afford a casing or housing for a pair of spaced apart, but parallel rotary shafts and their pistons or air impinging members carrier thereby. For the convenience of construction and assembling the parts, the compressor 11 as well as the expander housing, 12, is made of two hollow parts or shells 13 and 14 each of which has its ends closed and is provided at its longitudinal or horizontal edges with flanges 15 which are secured together by means of bolts 16 extended through suitable openings in said flanges and nuts 17 engaging said bolts. The adjacent ends of the housings of the compressor 11 and expander 12 are provided with peripheral flanges 18 which are also secured together by means of bolts 19 as is clearly shown in Figs. 1, 2 and 4 of the drawings.

Journaled in parallelism with one another and longitudinally in the housings 11 and 12 are a pair of shafts 20 and 21 which have their bearings in suitable housings 22 mounted on the outer ends of the housings 11 and 12 as is clearly shown in Fig. 2 of the drawings. Each of the shafts 20 and 21 has mounted thereon within each of the housings 22, a gear 23, which gears intermesh as will be understood by reference to Fig. 5 of the drawings, to the end that said shafts will be rotated in unison but toward each other. The shaft 21 which may be termed the driving shaft, is equipped at one of its ends with a clutch member 24 to which a suitable clutch member, not shown, and driven by the prime mover or electric motor may be connected in the usual or any suitable manner for imparting rotary motion to the shaft 21 and through it and the gears 23 to the shaft 20 which as before stated, is journaled alongside the driving shaft 21 and within said housings.

Each of the members 13 and 14 of the compressor 11 and expander 12 is provided with a plurality of inwardly extended transverse partitions 25 which meet at their inner edges, but each of said partitions is provided in its meeting edge with a pair of recesses 26 to receive the shafts 20 and 21 around which shafts the said partitions closely fit. Between each pair of said partitions and within each of the compartments located between the ends of the housings 11 and 12 and the partitions adjacent to said ends, is located circumferentially with respect to the walls of the housings a segmental partition 27 which may be and by preference are made integrally with said partitions and end members of the housings, and as is clearly shown in Figs. 2 and 5 of the drawings are spaced from the walls of the housings and with their concaved surfaces presented toward each other, but so as to leave openings 28 between their upper and lower edges for the passage of air from between the members 27 into the ports 29 which said members and the walls of the housings form.

Each of the ports 29 is extended mainly circumferentially with respect to the housings of the compressor 11 and expander 12, but is deflected at its lower portion laterally, as shown at 30 by dotted lines in Fig. 2 of the drawings, so that the series of ports will communicate with one another.

As is clearly shown in the last named figure, the compressor 11 is provided with 10 compartments indicated by the reference numerals 31, 32, 33, 34, 35, 36, 37, 38, 39 and 40, the last named compartment being located in the end of the expander 12, adjacent to the compressor, and that these compartments are gradually or consecutively reduced in width or area from the compartment 31 to the compartment 40, which has communication through an opening 41 in the lower portion of the expander 12 with a chamber 42 with which said expander is provided. The expander 12 is provided with a plurality of compartments 43, 44, 45, 46, 47, 48, 49 and 50 which compartments increase gradually or consecutively in size from the compartment 40 to the compartment 50 in said expander. As before stated, the ports 29 which are located externally of the compartments in the compressor, as well as those in the expander, have communication with each other through the deflected parts 30 of said ports. While I have shown the compressor provided with 10 compartments, and the expander with 8 compartments, yet I wish it to be understood, that I do not desire to limit myself to any specific number of compartments in either the compressor or expander, as I may employ a construction in which air will be gradually compressed and afterward gradually expanded without departing from the spirit of the invention. The compressor 11 is provided at the lower portion of its outer end with a chamber 51 which communicates with the port 29 of the initial or air receiving compartment, which is designated by the reference numeral 31, and said chamber 51 has extended therefrom a pipe 52, which leads to the refrigerator or refrigerating chamber or receptacle, not shown. The upper portion of the compartment 50 of the expander 12 has leading therefrom a pipe 53 which also communicates with the refrigerator or refrigerating chamber or receptacle, not shown.

Each of the shafts 20 and 21 is provided with a plurality of pistons or air impinging members 54 corresponding in number with the number of compartments in the compressor and expander or air engine, and said pistons or members are by preference, of the construction or type shown in Fig. 5 of the drawings for the reason I consider this type the best type for delivering large volumes of air under considerable pressure. These pistons or members 54 act as positive pressure members or blowers when used for compressing air, and as positive impellers of the shafts when used in the air expander or air engine, and it will be understood that there are a pair of the members 54 located in each of the compartments of the compressor and expander, and that the members of each pair co-act with one another in the revolution of the shafts on which they are mounted, as will be readily understood by reference to Fig. 5 of the drawings. While I prefer to use positive pressure members of the above described type, yet I do not desire to confine myself to said type, as I may employ any other type of positive rotary pressure members suitable for the work, just as long as the air in the compressor may be compressed to the necessary pressure and then expanded in sufficient quantities and with safety and economy. Mounted on the upper middle portion of the combined compressor and expander is a combined air cooler and oil separator, which is designated as a whole by the reference numeral 55 and consists of an outer casing 56, and inner casing 57, both of which are by preference cylindrical in shape, as shown. The inner casing 57 is concentrically located within the outer casing 56 at a distance therefrom and said inner casing has its upper end open, while the upper end of the outer casing is closed. Extended through the bottom of the cooler 55 is a vertical pipe 58 which has communication with the air compressor 11 through a port 59 leading from one of the compartments of the compressor as is clearly shown in Fig. 2 of the drawings. Mounted on the upper end of the pipe 58 is a hollow air deflecting cap 60 which is provided in its side walls with a series of perforations 61 through which air will pass laterally against the inner surface of the inner casing 57, which surface is by preference provided with vertical corrugations, as shown in Fig. 2 of the drawings. Located around the inner casing at a very slight distance therefrom, is a pipe coil 62, the outer surface of which is located at a slight distance from the inner surface of the outer casing 56 of the cooler, by which arrangement the air passing through said cooler will be forced into intimate contact with the coils 62 to which coil water may be supplied through a pipe 63 extended through the bottom or lower portion of the cooler and connected to a supply of cool or cold water, not shown. The other end of the pipe coil 62 has an outlet portion 64 which may lead to any suitable point for the discharge of water. The lower portion of the outer casing 56 is provided with an annular equalizing chamber 65 which has communication through ports 66 with the interior of the casing 56, so that the cooled air can pass from said casing into said chamber and from thence through a pipe 67 which leads to the chamber 42 on the lower portion of the expander 12, through the port 41 to the compartment 40 at the inner end of the expander. Leading from and communicating with the lower portion of the inner casing 57 or oil separator, is a pipe 68 which communicates at its other end with a chamber 51 on the lower portion of the front part of the compressor, and this pipe has within one of its couplings 69 a transverse diaphragm 70 which is provided with a bleed or very small perforation 71 to permit the passage of oil from the cooler 57 through the pipe 68 to the chamber 51 and from thence into the compartment 31, or initial compartment of the compressor, but to restrict the passage of air through said pipe.

The method of refrigeration by my machine, is as follows: Air is drawn from the refrigerator or refrigerating chamber, not shown, into the compressor, through the pipe 52 and compressed by the compressing means of the compressor to a suitable pressure whereby heat is generated, which heat is removed by the air cooler 55. This cooled air is then led through the pipe 67 to the air engine or expander 12 wherein expansion to atmospheric pressure will take place, and by reason of such expansion the impinging members 54 within the engine or expander will receive pressure, which in turn will assist the motor. The expanded air cools itself to a very low temperature and in this condition is discharged into a refrigerator or refrigerating chamber, not shown.

By supplying power to the shaft 21, it is evident that said shaft, as well as the shaft 20 will be rotated, thus causing the air impinging members 54, which are rigidly mounted on said shafts, and which members are out of contact with the partitions 25 of the various compartments, and also out of contact with the segmental members 27, to rotate toward each other and to co-act with one another in such a manner as to compress a suitable volume of air within the compressor. As air enters the first stage or compartment 31 of the compressor, it will be compressed therein and will pass through the deflected portion 30 of the port 29 surrounding said compartment into the adjacent compartment 32, which being narrower or of less area than the preceding stage or compartment, the air pressure naturally must increase, in order to deliver the same volume of air to the stage or compartment 33, that it has received from compartment 31. By arranging the widths or areas of all compartments or stages properly, air compression may be obtained, which closely approaches the adiabatic and if the compressor is provided with water jacket, not shown in the present instance, practically isothermal compression may be obtained or in other words, great efficiency. From the stage or compartment 39, or that stage or compartment at the inner end of the compressor when a greater or smaller number of compartments than shown in Fig. 2 is employed, the compressed hot air will be discharged into the air cooler 55 through the pipe 58 and air deflector 60 and will pass over the cooling or water pipe coil 62. The cooled compressed air will then be delivered through the pipe 67 into the lower part of the stage or compartment 40, which latter compartment determines the final pressure of the air, or after air has been cooled. This cooled air under pressure now enters the expander engine and is delivered under the lower part of stage or compartment 43 or the compartment of said engine adjacent to the pressure determining compartment above mentioned. These compartments and parts are of the same general arrangement as those of the compressor, except that in the expander the widths or areas of the stages or compartments thereof increase from the inner portion of the expander engine toward its outer end. As the compartment 43 of the expander is to deliver the same volume of air received from the preceding compartment or stage, it is evident that air pressure must decrease in proportion as compartment 43 is larger than compartment 40 or the preceding compartment. Therefore, pressure in the upper part of compartment 40 is smaller than pressure below, and the air pressure tends to rotate the members 54 in the same direction as said members of the compressor. The same operation takes place in all of the remaining stages or compartments of the expander engine. The air pressure will gradually drop to atmospheric pressure when the last compartment of the expander has been reached, in other words, the stages or compartments may be so arranged as to their widths or areas, that the expansion of the cooled air in the expander will follow the same law as the operation of the air in the compressor. I therefore obtain an air or expanding engine of high efficiency, producing low temperature of the air and restoring a great percentage of energy to the electric motor or prime mover. The cold air thus obtained in discharged through the pipe and compartment 50 or largest compartment of the expander through the pipe 53 into the refrigerator or refrigerating chamber, which completes the cycle of operations.

As the air impinging members 54 or pistons of the compressor and expander do not touch the walls of the housing or partitions, certain leakage of air cannot be avoided, but to prevent this to any great extent, a small quantity of oil is circulated through the compartments of the compressor, but not through the compartments of the expander. This oil acts as a seal, thereby greatly increasing the efficiency of the machine. The circulation of the oil simultaneously with the cooling of the compressed air is effected in the following manner: The heated air containing a certain amount of oil is discharged through the openings 61 in the air deflector 60 located in the combined cooler and oil separator, at an angle against the inner corrugated surface of the inner shell 57 thereby separating the oil from the air, which air will pass through the narrow passages between the walls of the inner and outer casings 56 and 57, respectively and the interposed pipe coil in such a manner, that the air is forced into intimate contact with the water cooled surfaces of said coil. This makes a small cooler possible; the water cooling coil will also cool the inner shell or casing 57 by convection, which will in turn help to facilitate the separation of the oil from the air. The separated and cooled oil is carried through the pipe 68 into the suction or initial port of the compressor, to be again circulated through the same.

Having thus fully described my invention, what I claim as new and desire to secure by Letters Patent is—

1. In a machine of the character described, the combination with an air compressor housing having therein a plurality of graduated compartments in communication with each other, of positive rotary means located in said compartments for the unitary and gradual compression of air, an air cooler having communication with said compressor and an air expanding engine housing having therein a plurality of graduated compartments in communication with each other and having communication with said cooler, and positive rotary means located in said compartments for the unitary and gradual expansion of air.

2. In a machine of the character described, the combination with an air compressor housing having therein a plurality of graduated compartments in communication with each other, of positive rotary means located in said compartments for the unitary and gradual compression of air, a combined air cooler and air and oil separator having communication with said compressor, an air expanding engine housing having a plurality of graduated compartments in communication with each other and with said cooler, and positive rotary means located in said compartments for the unitary and gradual expansion of air.

3. In a machine of the character described, the combination with an air compressor housing having therein a plurality of graduated compartments in communication with each other, of positive rotary means located in said compartments out of contact with the walls thereof for the unitary and gradual compression of air, a combined air cooler and an air and oil separator having communication with said compressor, an air expanding engine housing having a plurality of graduated compartments in communication with each other and with said cooler, and positive rotary means located in said compartments out of contact with the walls thereof for the unitary and gradual expansion of air.

JULIUS FRANKENBERG.

Witnesses:
CHAS. C. TILLMAN,
A. E. OLSON.